United States Patent

Saito et al.

[11] Patent Number: 5,225,079
[45] Date of Patent: Jul. 6, 1993

[54] MODULAR HOLLOW-FIBER FILTER UNIT

[75] Inventors: Masaharu Saito; Tomotaka Mitsuhashi, both of Fujisawa, Japan

[73] Assignee: NOK Corporation, Tokyo, Japan

[21] Appl. No.: 861,008

[22] Filed: Mar. 31, 1992

[30] Foreign Application Priority Data

Aug. 1, 1991 [JP] Japan ................................. 3-68355[U]

[51] Int. Cl.[5] .................................................. B01D 63/02
[52] U.S. Cl. ........................... 210/321.61; 210/321.8; 210/321.89; 210/500.23
[58] Field of Search ............ 210/321.8, 321.78, 321.79, 210/321.87, 321.88, 321.89, 500.23, 321.61

[56] References Cited

U.S. PATENT DOCUMENTS 5,102,533  4/1992  Oshiyama .................. 210/321.8

FOREIGN PATENT DOCUMENTS 58-163490  9/1983  Japan .
61-171593  8/1986  Japan .
63-21294   6/1988  Japan .
3-169329   7/1991  Japan .

Primary Examiner—Frank Sever
Attorney, Agent, or Firm—Jacobson, Price, Holman & Stern

[57] ABSTRACT

A modular hollow-fiber filter unit (10; 100; 200) for use in a water purifier includes a jacket member (24; 104; 204) surrounding a bundle (20) of hollow fibers (22; 106; 206) within a housing (12; 102; 202). The jacket member has one or more air-vent passages or pockets (30) defined by air-pervious, liquid-impermeable wall members (42; 64) to vent air bubbles accumulated within the housing (12; 102; 202) of the filter unit.

15 Claims, 7 Drawing Sheets

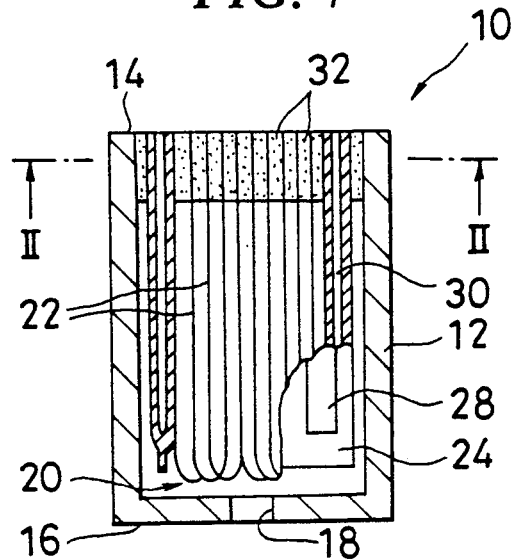
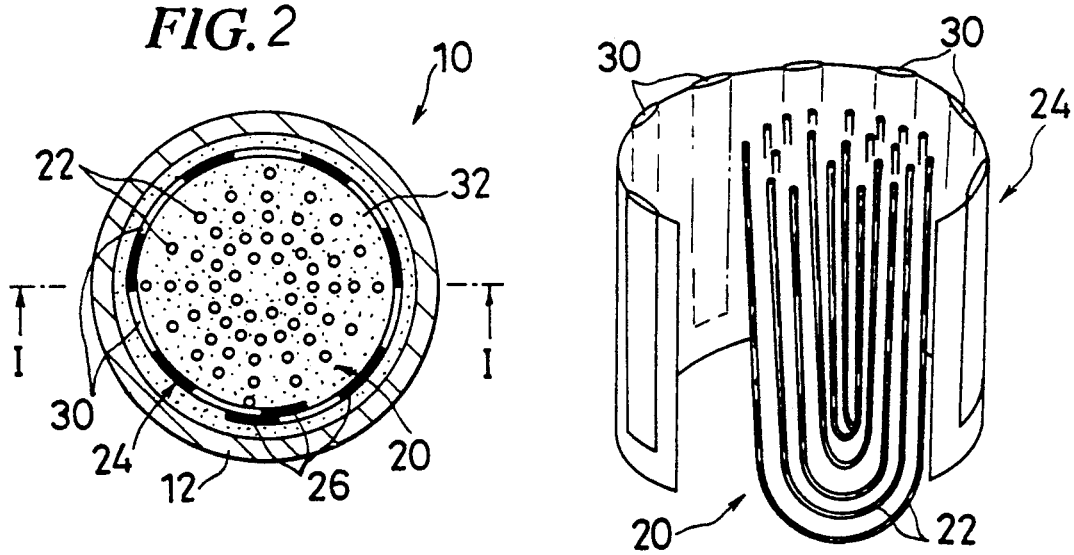
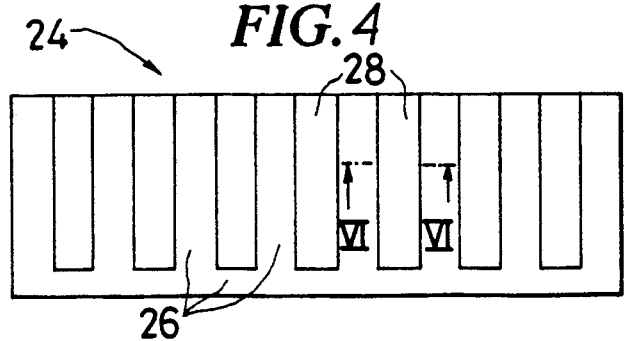

MODULAR HOLLOW-FIBER FILTER UNIT

BACKGROUND OF THE INVENTION

1. Field of the Invention

The present invention relates to a modular hollow-fiber-membrane filter unit for use in filtering aqueous liquid in, for example, a water purifier.

2. Description of the Prior Art

Japanese Patent Kokai Publication No. 61-171593, published Aug. 2, 1986, discloses an example of a water purifier incorporating a modular replaceable hollow-fiber-membrane filter unit, commonly referred-to in the industry as a "hollow fiber module". Water to be treated is forced to flow across an activated charcoal filter for the purpose of deodorization and is then admitted to the "module" to remove organic and inorganic impurities and particulates carried in water. The module has a housing to which a bundle of hollow fibers are sealingly bonded. Each fiber is hollow in structure and is defined by a tubular hydrophilic microporous wall acting as a membrane of filtration.

Various methods are known in the art for the manufacture of microporous hollow membrane fibers. For example, in the melt-spinning method, molten polyolefins are extruded through an annular nozzle and are drawn and stretched into a hollow fiber having a mechanically created microporous structure as shown, for example, in FIG. 1 of Japanese Patent Kokai Publication No. 58-163490, published Sep. 28, 1983. In another method, known as the wet-type phase inversion method, a solution of polysulfones and water-soluble pore-forming agent dissolved in a solvent is extruded through an annular nozzle into an aqueous deposition bath in which a hollow fiber is deposited with a microporous wall structure of the open-cell type being formed by release of the pore-forming agent.

The material forming the hollow fibers is often hydrophilic. Otherwise, it is rendered hydrophilic by subsequent surface treatment. Therefore, the micropores formed in the wall of the hollow fibers are accessed by water to be filtered which passes through the micropores to enter into the hollow fibers when a differential pressure exists across the tubular wall of respective fibers.

The problem which must be overcome in designing a modular filter unit incorporating the microporous hollow fibers is that the hydrophilic nature of the hollow fibers prevents venting of air bubbles once accumulated in the filter module. More specifically, air may inadvertently enter the module when water supply to the water purifier is momentarily interrupted for any reasons or when the water purifier is disconnected from the water supply conduit or the module accidentally pulled out of the purifier. During the normal and proper use of the purifier wherein the module is fully immersed in water, each micropore of the hollow fibers are filled with water. However, when air is once allowed to inadvertently enter the module, a film of water is retained under the surface tension in each of the micropores contacted by air bubbles because of the hydrophilic nature of the hollow fibers. Since the water film thus retained prevents air from entering through the micropores into the hollow fibers and, therefore, precludes air from being vented through the fibers, it causes air to be accumulated within the the module. The result of this is that the micropores are clogged or "locked" by air bubbles, as viewed from water to be filtered, so that the efficiency of filtration of the module is lowered.

Various efforts have been made in the prior art to prevent the "air-lock" of the module and to maintain the filtering efficiency of the hollow fiber module. For example, Japanese Patent Kokai Publication No. 58-163490, cited above, proposes use of an air vent arrangement as illustrated in FIGS. 5–7 thereof. In the embodiment thereof shown in FIGS. 5 and 7, a separate housing containing a bundle of hollow fibers is affixed to the module. In the embodiment shown in FIG. 6, a container provided with a membrane is used. Such arrangements, however, are complex in structure and are costly. Japanese Utility Model Kokoku Publication No. 63-21294, published Jun. 13, 1988, proposes use of air-pervious hydrophobic hollow fibers 2 intermingled with water-permeable hydrophilic hollow fibers 1, as shown in FIG. 1 thereof. FIG. 2 of that publication discloses hollow fibers having air-pervious portion 2 and water-permeable portion 1. Such filter module is difficult to manufacture because different fibers must be intermingled with each other. In addition, the use of air-pervious hollow fibers 2, in turn, limits the number of hollow fibers 1 effectively involved in filtration of water, so that the overall efficiency of the module is decreased.

SUMMARY OF THE INVENTION

Accordingly, an object of the present invention is to provide an improved modular hollow-fiber filter unit.

Another object of the invention is to provide a modular hollow-fiber filter unit having an effective air-vent arrangement and which is simple in structure.

A further object of the invention is to provide a modular hollow-fiber filter unit having an air-vent arrangement which is effective in function and is easy to install.

According to the invention, there is provided a modular filter unit having a housing in which a bundle of hollow membrane fibers are arranged. The bundle may comprise hollow fibers bent into U-shape and open at both ends, straight fibers open at one end and closed at the other end, or a combination thereof, as well known in the art. Respective fibers are sealingly bonded to the housing in the conventional manner by a sealing material known in the art as potting resin.

The feature of the present invention resides in the use of a jacket member surrounding the fiber bundle. The jacket member may comprise a flexible composite sheet of air-pervious, liquid-impermeable material in which one or more, axially-extending, internal air-vent passages or pockets are provided.

The use of the jacket member is of particular advantage because it provides a wider coverage for the fibers in the bundle and, therefore, provides an extensive area of contact for the air bubbles that might enter into the module. Accordingly, the air bubbles are provided with an increased opportunity of access to the air-vent passages or pockets in the jacket and are effectively vented out of the module.

Another important advantage provided by the jacket member is the ease of manufacture. Thus, respective hollow fibers are simply fastened and tied into a bundle by making use of the flexible jacket member. The fiber bundle as encircled or wrapped by the jacket may then be inserted within the housing of the unit, followed by sealing by the conventional potting material to form a final module. In this way, the modular filter units may be fabricated in a simple manner. This permits automated manufacture of the filter modules. Further, the jacket member protects the fibers in the bundle from being damaged due to contact with the housing when they are inserted into the housing.

Preferably, the jacket member is made by bonding, such as by heat sealing, two layers of hydrophobic, microporous material. Heat sealing may be carried out along a predetermined contour such that the internal air-vent passages or pockets are left between the microporous layers after heat sealing. Preferably, one or more spacer layers of heat-sealable non-woven fabric or embossed film are sandwiched between the outer two layers of microporous material in order to positively space apart the outer layers and to prevent the passages or pockets from being collapsed under water pressure.

The layers of hydrophobic, microporous material function as air-pervious, liquid-impermeable membranes to selectively allow air to pass through the membrane walls into the passages or pockets and to be then vented to the downstream side of the module.

These features and advantages of the invention, as well as other features and advantages thereof, will become apparent from the following description with reference to the accompanying drawings.

BRIEF DESCRIPTION OF THE DRAWINGS

FIG. 1 is a schematic elevational representation, partly in cross-section taken along the line I—I of FIG. 2, of the modular filter unit according to the first embodiment of the invention;

FIG. 2 is a schematic cross-sectional view taken along the line II—II of FIG. 1;

FIG. 3 is a schematic perspective exploded view illustrating the fiber bundle and the jacket member as removed from the housing;

FIG. 4 is a schematic side elevational view showing the jacket member as extended;

Throughout different drawings, similar parts and members will be designated by like reference numerals.

DESCRIPTION OF THE PREFERRED EMBODIMENTS

Figure 5A:
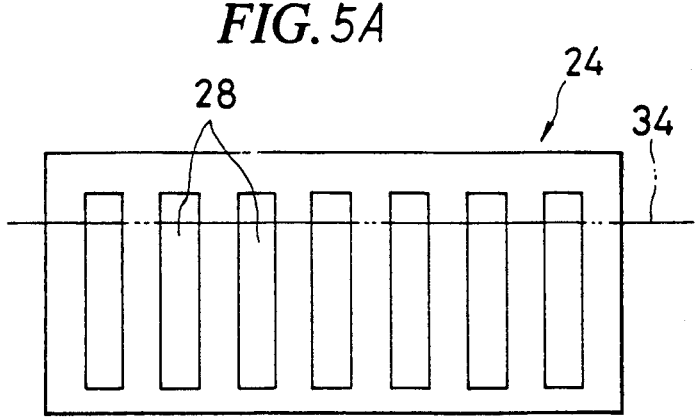
FIGS. 5A through 5D are schematic views illustrating various steps of making the filter unit.
Figure 5B:
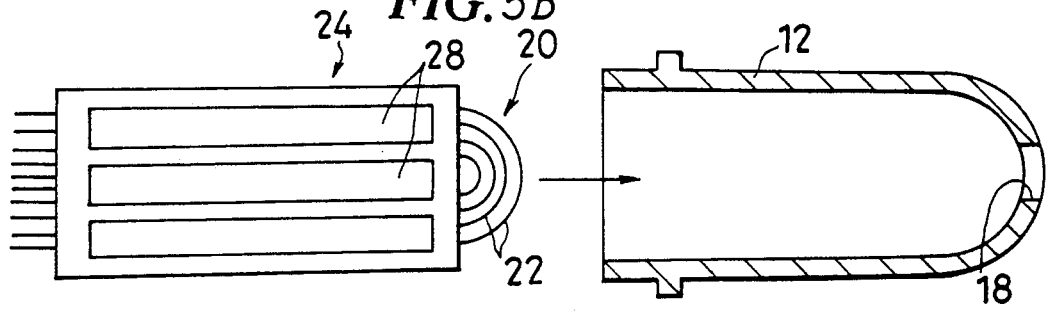
Figure 5C:
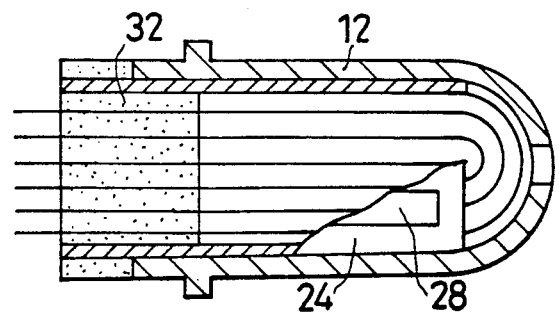
Figure 5D:
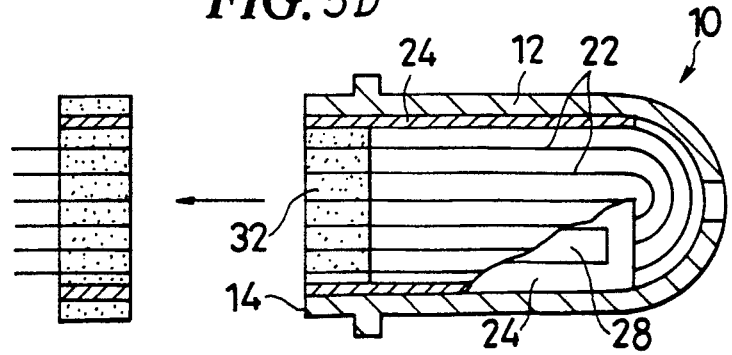

Referring to FIGS. 1 and 2, there is shown a modular filter unit according to the first embodiment of the invention suitable for use in a water purifier. The modular filter unit 10 has a tubular housing 12 made of suitable thermoplastic material and having an upper end 14 and a lower end 16 with an inlet opening 18 for water to be purified. A bundle 20 of individual hollow fibers 22 are placed within the housing 12 and surrounded by a jacket member 24. The hollow filtration fibers 22 may be conventional ones. In the illustrated embodiment, microporous hollow fibers of polysulfones manufactured by the wet-type phase inversion method are used.

As best shown in FIG. 3 wherein the fiber bundle 20 and the jacket member 24 are shown as being removed from the housing 12 and exploded, each fiber 22 in the bundle 20 is bent into U-shape so that their open ends are directed upwardly. Respective fibers 22 are loosely bound together by the jacket member 24.

The jacket member 24 may be a sheet or strip of composite structure comprising a pair of layers of hydrophobic, microporous, heat-sealable material partly heat sealed with each other. The detailed structure of the composite sheet will be described later with reference to FIGS. 6-9. The microporous layers forming the jacket member 24 are partly heat sealed with each other along a comblike configuration as shown at 26 in FIG. 4, so that a plurality of elongated non-heat sealed sections 28 remain in the jacket member 24. These portions 28 not heat sealed create elongated discrete passages or pockets 30, as best shown in FIG. 3. Interstices between respective fibers 22, jacket member 24 and housing 12 are fluid tightly sealed in the conventional manner by a mass of potting resin 32.

In use, the hydrophobic, microporous wall defining the passages or pockets 30 of the jacket member 24 serves as a membrane to selectively allow air to pass therethrough into the passages or pockets 30 due to the hydrophobic nature of the wall. Air collected in the passages or pockets 30 is allowed to flow downstream of the filter unit 10. In this manner, the passages or pockets 30 defined by the hydrophobic, microporous wall of the jacket member 24 function as air vent passages for venting air accumulated in the housing 12.

The modular filter unit 10 may conveniently be manufactured as illustrated in FIG. 5. The jacket member 24 initially may be heat sealed along the entire outer contour as shown in FIG. 5A, with the non-heat sealed portions 28 being left similar to an islands-in-the-sea structure. A plurality of hollow fibers 22 are bent into U-shape and the jacket member 24 is then used to fasten the hollow fibers 22 into the bundle 20 as shown in FIG. 5B. The assembly is then inserted within the housing 12. During introduction, the jacket member 24 protects the fibers 22 from being damaged or injured due to collision with the edge of the housing 12 or other objects. Moreover, introduction of the hollow fibers 22 into the housing 12 is readily carried out since they are bundled by the jacket member 24. Thereafter, a quantity of uncured potting material such as polyurethane resin is injected at an end of the housing 12 as shown in FIG. 5C in a manner well known in the art by the conventional centrifugal molding process. The polyurethane resin is allowed to cure and any excessive materials are cut off as shown in FIG. 5D along a cutting plane defined by the end face 14 of the housing 12 to obtain the final product 10. In FIG. 5A, the cutting plane is shown by the line 34. In this manner, the modular filter unit 10 having the air vent passages or pockets 30 circumferentially equally spaced apart from each other can be readily manufactured.

Referring to FIGS. 6-9, preferred forms of the composite sheet structure forming the jacket member 24 incorporating the air vent passages or pockets 30 and the method of making thereof will be described.

Figure 6A:
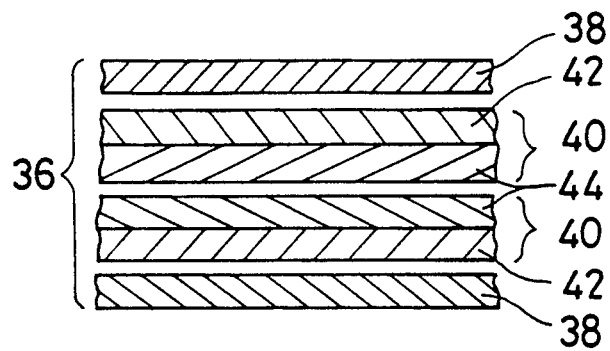
FIG. 6A is an enlarged schematic fragmental cross-sectional view showing the first form of the composite sheet prior to heat sealing.

FIG. 6A illustrates a first form of the composite sheet prior to heat sealing. The sheet 36 includes a pair of outer layers 38 of non-woven fabric of polyethyleneterephthalate having a melting point of about 240° C. and a pair of inner layers 40 of polypropylene having a melting point of about 140° C. Each of the inner layers 40 may be a commercially available laminated film and may consist of an outer hydrophobic microporous film 42 of polypropylene and an inner layer 44 of non-woven fabric of polypropylene. The layer 42 of hydrophobic microporous polypropylene functions as an air-pervious, liquid-impermeable membrane nd selectively allows air to pass therethrough.

Figure 6B:
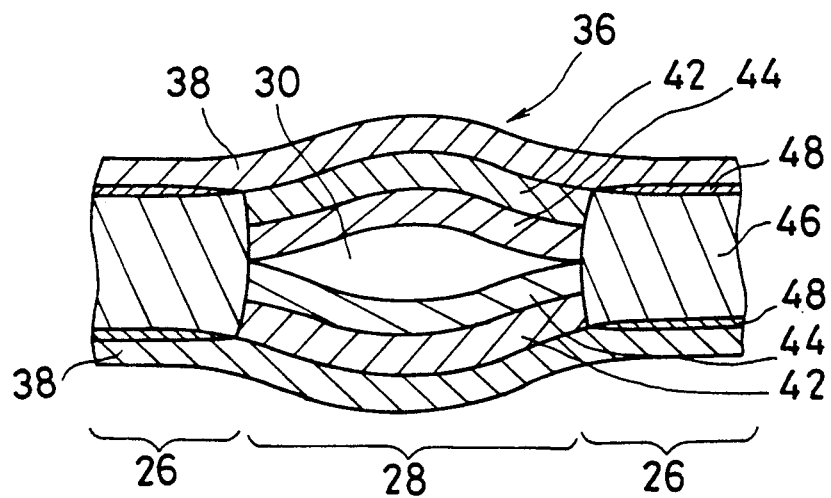
FIG. 6B is an enlarged schematic cross-sectional view taken along the line VI—VI of FIG. 4 and showing the first form of the composite sheet.

The sheet 36 is then partly heat sealed along a predetermined contour as described before with reference to FIGS. 4 and 5A at a temperature ranging from 140° C. to 240° C. so that portions of the inner layers 40 are fused but the outer layers 38 of non-woven fabric remain unmelted. As a result, as shown in FIG. 6B, portions of the inner layers 40 situated in the heat sealed portions 26 are merged with each other to form integral section 46. The outer layers 38 of non-woven fabric are partly impregnated by the molten mass of polypropylene to form impregnated portions 48 by which the outer layers 38 are firmly bonded to the integral section 46. In each of the regions 28 not heat sealed, the air-vent passage or pocket 30 is formed as shown between layers 44 of non-woven fabric. When the sheet 36 thus prepared is placed in the housing 12 and sealed by the potting resin 32 as described before with reference to FIG. 5C, the outer layers 38 of non-woven fabric are intimately and uniformly impregnated by the potting material so that the outer surfaces of the hydrophobic microporous film 42 are fluid tightly sealed by the potting resin. In this manner, the use of the outer layers 38 of non-woven fabric is advantageous in providing a leak-proof seal 50 along the outer surfaces of the air-pervious membrane 42 at the end 14 of the filter unit 10 where the potting resin 32 is provided.

Figure 7A:
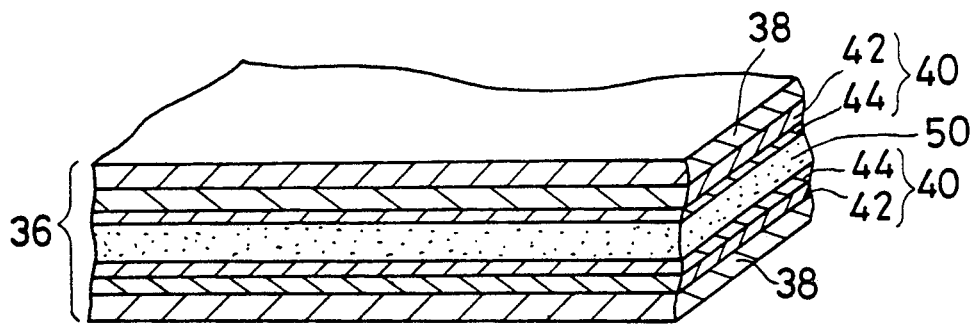
FIG. 7A is an enlarged schematic fragmental cross-sectional view similar to FIG. 6A but showing the second form of the composite sheet prior to heat sealing.
Figure 7B:
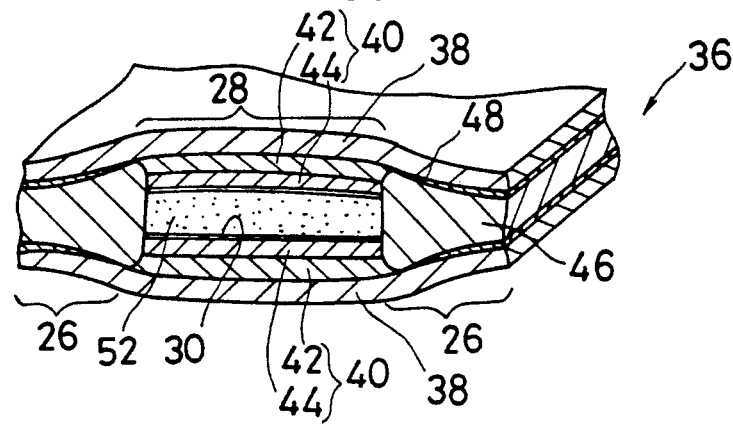
FIG. 7B is a schematic cross-sectional view similar to FIG. 6B but showing the second form of the composite sheet.

FIGS. 7A and 7B show another form of the composite sheet forming the jacket member 24. Parts and members similar to those of FIGS. 6A and 6B are indicated by like reference numerals and will not be described again. In this form, the composite sheet 36 includes a layer 50 of non-woven fabric of polypropylene sandwiched between the inner layers 40. The non-heat sealed portion 52 of the layer 50 serves to positively space apart the overlying layers 40 from each other and to prevent the passage or pocket 30 from being collapsed under water pressure.

Figure 8A:
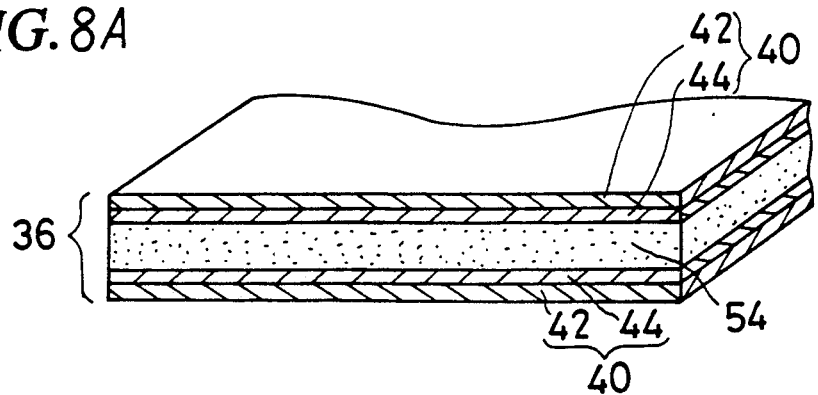
FIG. 8A is an enlarged schematic fragmental cross-sectional view similar to FIG. 6A but showing the third form of the composite sheet prior to heat sealing.
Figure 8B:
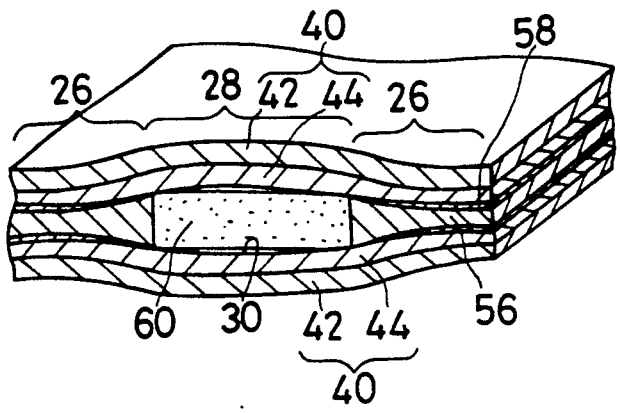
FIG. 8B is a schematic cross-sectional view similar to FIG. 6B but showing the third form of the composite sheet.

FIGS. 8A and 8B show a further form of the composite sheet forming the jacket member 24. Here also, parts and members similar to those of FIGS. 6A and 6B are indicated by like reference numerals and will not be described. In this form, a layer 54 of non-woven fabric made of polyethylene having a melting point of 70°-80° C. is sandwiched between the laminated films 40 of polypropylene. Heat sealing may be carried out at a temperature ranging from 80°-140° C. so that the polyethylene layer 54 of non-woven fabric is fused along the heat seal to form a heat sealed portion 56. During heat sealing, a quantity of molten polyethylene will be impregnated partly into the layer 44 of non-woven fabric of polypropylene as shown at 58 in FIG. 8B. The impregnated portion 58 serves to bond the layers 44 with each other. The non-heat sealed portion 60 of the layer 54 of n non-woven fabric of polyethylene functions as a spacer layer for spacing the layers 44 apart.

Figure 9:
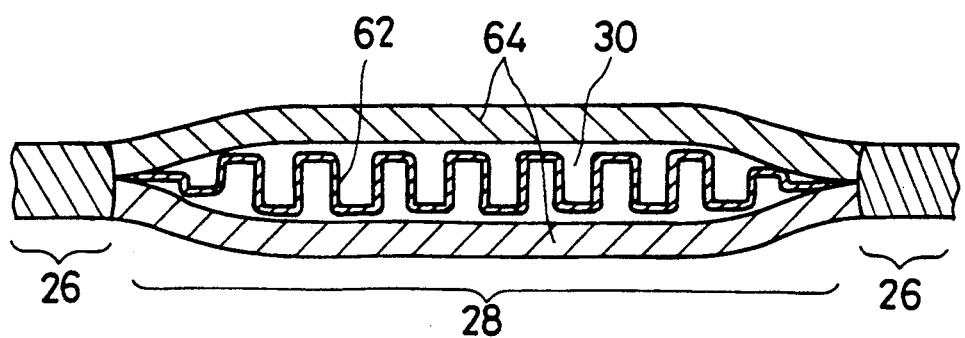
FIG. 9 is an enlarged schematic fragmental cross-sectional view similar to FIG. 6B but showing the fourth form of the composite sheet.

FIG. 9 shows another form of the composite sheet in which a conventional embossed film 62 of polyethylene is sandwiched between a pair of hydrophobic microporous layers 64 of polyethylene acting as the air-pervious water-impermeable membrane. The layers 64 and the embossed film 62 are heat sealed with each other at regions 26. In the regions 28 not heat sealed, the embossed film 62 acts as a spacer to space apart the layers 64 to thereby positively define the air vent passage or pocket 30 therebetween. The present inventors have found that, by surface treating the polyethylene layers 64 by subjecting them to corona discharge, the surface roughness thereof is increased high enough to enable the potting resin to firmly adhere to the surfaces of the microporous polyethylene layers 64 to establish a fluid tight seal therealong.

Figure 10A:
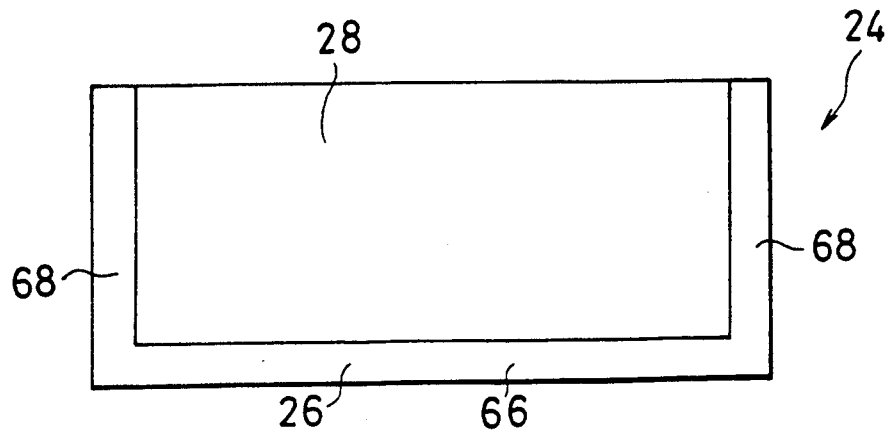
FIGS. 10A through 10H are schematic representations showing various patterns of heat seal.
Figure 10B:
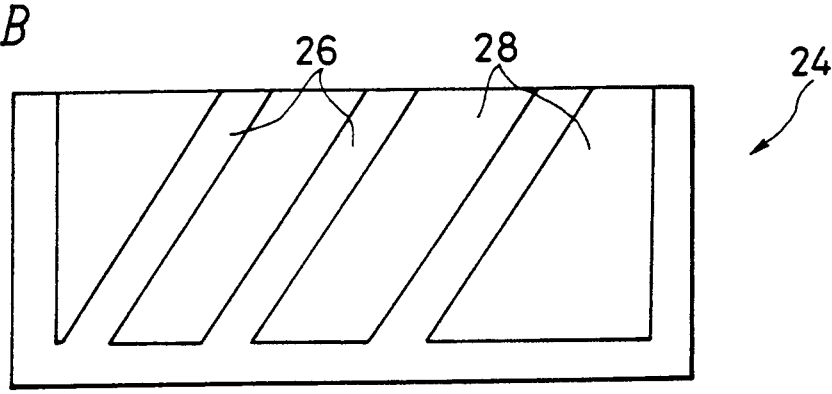
Figure 10C:
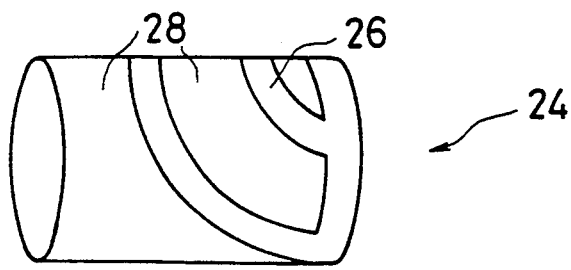
Figure 10D:
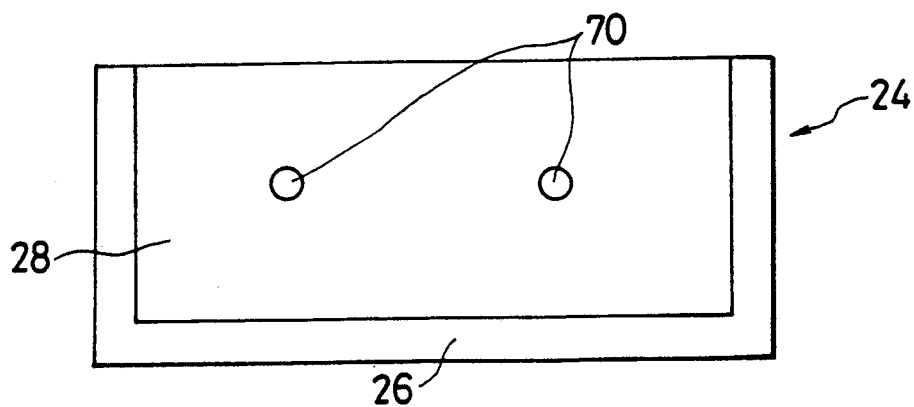
Figure 10E:
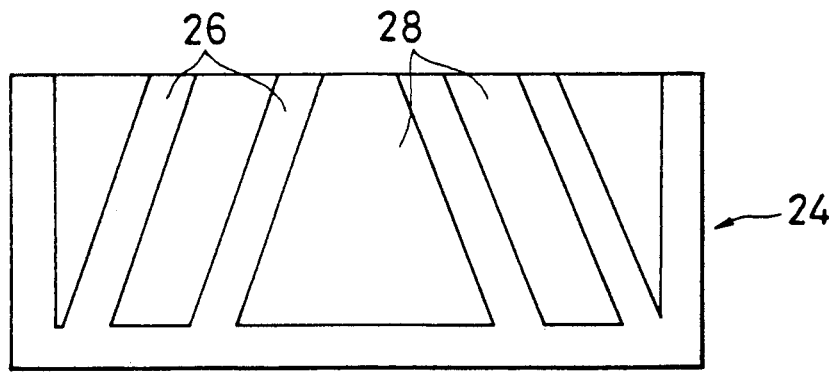
Figure 10F:
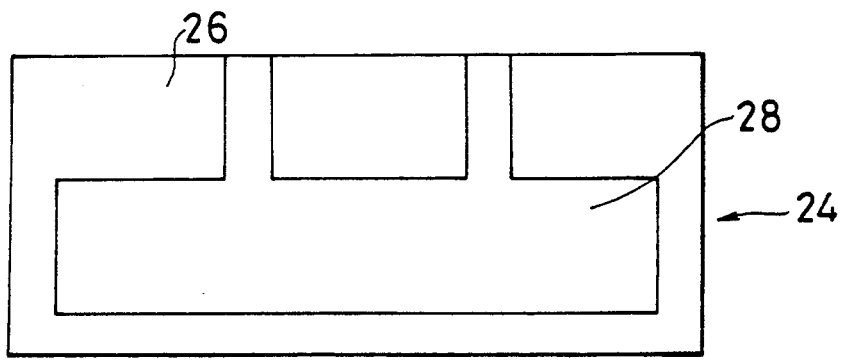
Figure 10G:
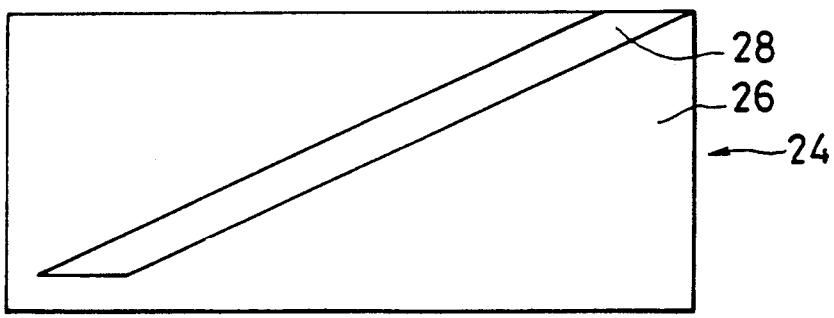
Figure 10H:
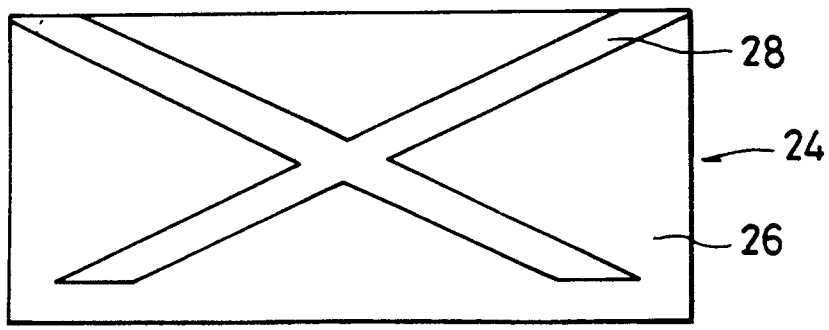

FIGS. 10A through 10H illustrate various heat seal patterns which may be applied to the composite sheet 36 to obtain the jacket member 24. In the pattern of FIG. 10A, the sheet is heat sealed only along the lower side 66 and the lateral sides 68. This pattern provides a greater surface area for the air vent passage or pocket 30 so that the efficiency of air vent is increased. In the pattern shown in FIG. 10B, the intermediate heat sealed portions 26 are inclined. With this arrangement, the passages or pockets 30 will extend spirally as shown in FIG. 10C to ensure that air is vented even when the modular filter unit is horizontally installed within a water purifier. The pattern of FIG. 10D includes spot-like heat sealed portions 70 added to the pattern of FIG. 10A. The spot heat sealed portions 70 serve to prevent the component layers of the composite sheet from being displaced with each other. FIGS. 10E show through 10H various other heat seal patterns which will be self-explanatory.

Figure 11:
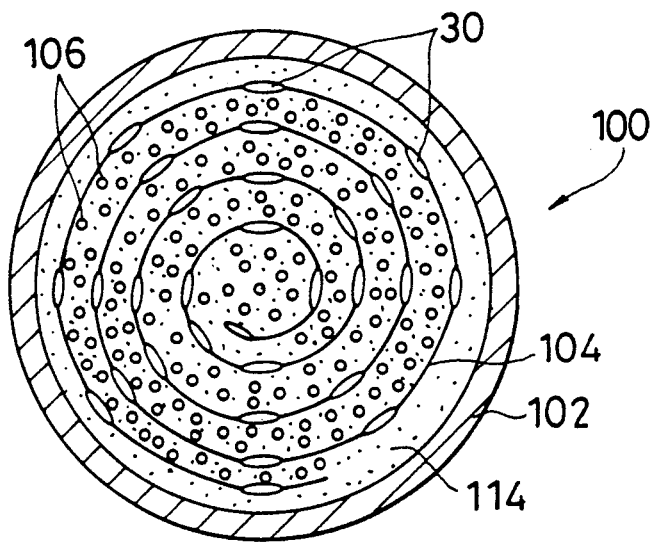
FIG. 11 is a schematic cross-sectional view similar to FIG. 2 but showing the second embodiment of the invention.
Figure 12:
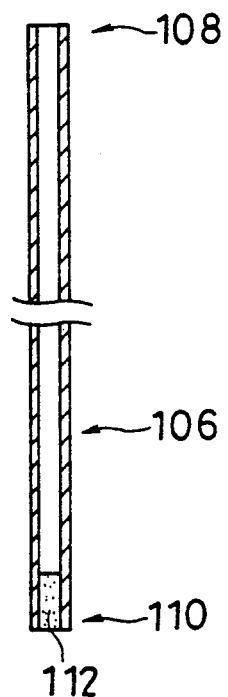
FIG. 12 is a schematic cross-sectional view showing a straight hollow fiber; and, FIG. 13 is a schematic cross-sectional view similar to FIG. 2 but showing the third embodiment of the invention.

FIG. 11 illustrates a modular filter unit according to the second embodiment of the invention. The filter unit 100 includes a housing 102 which is similar to the housing 12 of the first embodiment. A jacket member 104, similar to the jacket 24 of the foregoing embodiment and provided with a plurality of air-vent passages or pockets 30, is arranged to spirally encircle the bundle of hollow fiber membranes 106 in such a manner as to be helically interleaved within the fiber bundle. In order to facilitate helical bundling, it is preferable to use conventional straight fibers 106 as shown in FIG. 12 having an end 108 open and the other end 110 closed by potting material 112. However, U-shaped fiber bundle as shown in FIG. 3 may also be used. The interstices between the fibers 106, the jacket member 104 and the housing 102 are sealed at the upper end of the modular filter unit 100 by potting material 114 in the conventional manner. The advantage of the second embodiment 100 is that air accumulated in the central region of the fiber bundle is effectively vented due to the helical arrangement of the jacket member 104.

Figure 13:
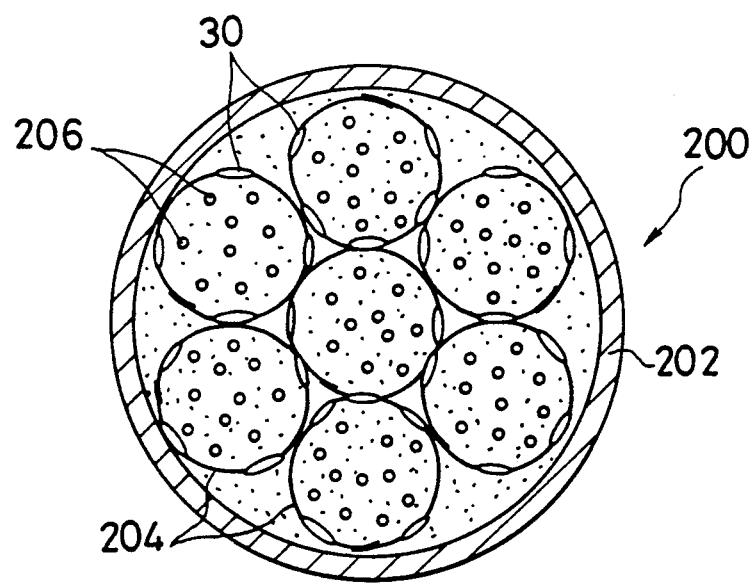

FIG. 13 shows a modular filter unit according to the third embodiment of the invention. In this embodiment, the modular filter unit 200 includes a housing 202 in which a plurality of jacket member 204 are received, with each jacket members 204 surrounding a bundle of hollow fibers 206 in a manner similar to the jacket member 24 of the first embodiment.

While the present invention has been described herein with reference to the specific embodiments thereof, it is contemplated that the invention is not limited thereby and various modifications and alterations may be made therein without departing from the scope of the invention.

What is claimed is:

1. A modular filter unit for filtration of liquid comprising:
   a tubular housing having a first end and a second end;
   a bundle of hollow filtration fibers disposed in said housing, each of said hollow fibers being bent into U-shape with open ends thereof proximate said first end of said housing;
   a jacket member disposed in said housing and surrounding said bundle of fibers;
   venting means in said jacket member for venting air accumulated within said housing in use; and
   sealing means for bonding said fibers and jacket member to said housing at said first end of said housing and fluid tightly sealing interstices between said fibers, jacket member and housing at said first end of said housing, with said open ends of said fibers opening at said first end of said housing.

2. A modular filter unit as claimed in claim 1, wherein:
   said jacket member comprises a composite sheet of air-pervious, liquid-permeable material; and
   said venting means comprises at least one internal air-vent passage in said sheet, said passage having one open end at said first end of said housing and a second closed end.

3. A modular filter unit as claimed in claim 2, wherein:
   said composite sheet comprises two layers of hydrophobic, microporous material; and
   said layers are partly bonded together along a contour so that said at least one air-vent passage is disposed therebetween.

4. A modular filter unit as claimed in claim 3, wherein:
   said hydrophobic, microporous material comprises heat sealable material; and
   said layers are partly heat sealed together to provide said at least one air-vent passage therebetween.

5. A modular filter unit as claimed in claim 4, wherein said composite sheet further comprises:
   a third layer of heat-sealable nonwoven fabric sandwiched between said two layers and partly heat sealed to said two layers; and
   a portion of said third layer not heat sealed to said two layers spacing apart portions of said two layers from each other to positively define therebetween said at least one air-vent passage.

6. A modular filter unit as claimed in claim 5, wherein said composite sheet further comprises:
   a pair of outer layers of non-woven fabric bonded, respectively, to said two layers so that said sealing means is fluid tightly impregnated within said outer layers.

7. A modular filter unit as claimed in claim 2, wherein:
   said venting means comprises a plurality of said internal air-vent passages circumferentially spaced apart from each other.

8. A modular filter as claimed in claim 4, wherein said composite sheet further comprises:
   a heat-sealable embossed film sandwiched between said two layers and partly heat sealed to said two layers; and
   a portion of said embossed film not heat sealed to said two layers spacing apart portions of said two layers from each other to positively define therebetween said at least one air-vent passage.

9. A modular filter unit as claimed in claim 1, wherein:
   said jacket member is helically shaped and encircles said hollow fibers to retain said fibers in said bundle.

10. A modular filter unit as claimed in claim 1, wherein:
    said jacket member is interleaved at least in part within said bundle of hollow fibers.

11. A modular filter unit for filtration of liquid comprising:
    a tubular housing having a first end and a second end;
    a bundle of hollow filtration fibers disposed in said housing, each of said hollow fibers having one open end proximate said first end of said housing and having another end closed proximate said second end of said housing;
    a jacket member disposed in said housing and surrounding said bundle of fibers;
    venting means in said jacket member for venting air accumulated within said housing in use; and
    sealing means for bonding said fibers and jacket member to said housing at said first end of said housing and fluid tightly sealing interstices between said fibers, jacket member and housing at said first end of said housing, with said open ends of said fibers opening at said first end of said housing.

12. A modular filter unit as claimed in claim 11, wherein:
    said jacket member comprises a composite sheet of air-pervious, liquid-impermeable material; and
    said venting means comprises at least one internal air-vent passage in said sheet; said passage having one open end at said first end of said housing and a second closed end.

13. A modular filter unit as claimed in claim 12, wherein:
    said composite sheet comprises two layers of hydrophobic, microporous, heat sealable material; and
    said layers are partly heat sealed together along a contour so that said at least one air-vent passage is disposed therebetween.

14. A modular filter unit as claimed in claim 13, and further comprising:
    spacer means for positively spacing apart non-heat sealed portions of said two layers from each other to define therebetween said at least one air-vent passage.

15. In a modular hollow-fiber filter device having a bundle of hollow fibers disposed within a housing and fluid tightly sealed with respect to said housing for filtering liquid flowing therethrough, the improvement comprising: a jacket member surrounding said bundle of hollow fibers and comprising passage means therein defined by air-pervious, liquid-impermeable wall members for venting air accumulated within said housing.

* * * * *

UNITED STATES PATENT AND TRADEMARK OFFICE
CERTIFICATE OF CORRECTION

PATENT NO. : 5,225,079
DATED : July 6, 1993
INVENTOR(S) : Masaharu Saito; Tomotaka Mitsuhashi It is certified that error appears in the above-indentified patent and that said Letters Patent is hereby corrected as shown below:

Column 7, line 36, claim 2, delete "liquid-permeable" and insert --liquid-impermeable--.

Signed and Sealed this

Eighth Day of March, 1994

Attest:

BRUCE LEHMAN

*Attesting Officer*    *Commissioner of Patents and Trademarks*